United States Patent Office 3,198,706
Patented Aug. 3, 1965

3,198,706
METHODS OF REDUCING BLOOD SUGAR
AND COMPOSITIONS THEREFOR
Heinrich Ruschig, Bad Soden, Taunus, Walter Aumüller, Gerhard Korger, Hans Wagner, and Josef Scholz, Frankfurt am Main, and Alfred Bänder, Hofheim, Taunus, Germany, assignors to Farbwerke Hoechst Aktiengesellschaft vormals Meister Lucius & Brüning, Frankfurt am Main, Germany, a corporation of Germany
No Drawing. Original application July 31, 1956, Ser. No. 601,107. Divided and this application Apr. 9, 1962, Ser. No. 185,865
Claims priority, application Germany, Oct. 15, 1955, F 18,659; Jan. 7, 1956, F 19,256
6 Claims. (Cl. 167—65)

This application is a division of application Serial No. 601,107, filed July 31, 1956.

It is known from literature that certain compounds belonging to the class of aminobenzene sulphonamides are capable of lowering the blood sugar value in test animals, for example, of dogs. Thus, for example, para-amino-benzene-sulphonamido-isopropyl-thiodiazole produces a moderate lowering of the blood sugar value in dogs for 4 to 6 hours (compare: Jean la Barre and Jean Reuse, Arch. néerland. physiol. 28 [1947], page 475).

There are also known certain benzene-sulphonyl ureas, such as N-benzenesulphonyl-urea, N-benzene-sulphonyl-N'-phenyl-urea, N-benzenesulphonyl-N':N'-diethyl-urea, N-para-toluene sulphonyl-urea and N-para-toluenesulphonyl-N'-phenyl-urea (compare: Chem. Rev., volume 50, pages 28, 29). However, these substances have not yet attained any commercial importance. Other products belonging to the series of sulphonyl-ureas are known from U.S. Patent No. 2,390,253 and French specification No. 993,465.

The present invention provides benzene sulphonyl-ureas of the general formula

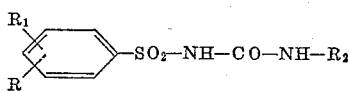

in which R represents hydrogen, chlorine, bromine, further alkyl and alkoxy groups having at most 6 carbon atoms, especially the methyl and methoxy groups, $R_1$ means chlorine or bromine and $R_2$ represents an alkyl-, alkenyl-, cycloalkyl- or cycloalkylalkyl radical containing 2 to 7 or 8 carbon atoms and non-toxic basic salts thereof.

The radical R may be an alkyl- or alkoxy radical containing 1 to 6 carbon atoms. As alkyl groups are mentioned, for example, methyl, ethyl, propyl, butyl, pentyl or hexyl, especially methyl. The alkyl substituent may be unbranched or branched, and may be bound in the para-position of the phenyl radical or in other positions; in the latter case more especially in the meta-position. The radical R may also be a chlorine or bromine atom.

There may also be mentioned dihalogeno phenyl radicals, such as dichloro- or dibromo phenyl groups. There may also be mentioned phenyl residues that contain both an alkyl or alkoxy group and a halogen atom, such as a methyl-chlorophenyl group. The substituents may be bound in any desired position to the benzene nucleus.

$R_1$ may be chlorine or bromine.

The compounds of the above general formula are made by methods known for making sulphonyl-ureas. As examples the following processes may be mentioned:

A benzene-sulphonyl isocyanate substituted by 1 or 2 halogen atoms or by a halogen atom and an alkyl or alkoxy group in the benzene nucleus, may be reacted with a primary butylamine or another primary alkylamine or an alkenylamine, cyclo-alkylamine or cycloalkylalkyl-amine containing 2 to 7 or 8 carbon atoms. Conversely, the desired sulphonyl-urea can be made by reacting a butyl isocyanate or other appropriate isocyanate with a benzene-sulphamide substituted by 1 or 2 halogen atoms or by a halogen atom and an alkyl or alkoxy group in the benzene nucleus, advantageously in the form of a salt thereof. Instead of isocyanates there may be used compounds convertible into isocyanates in the course of the reaction, such as acid azides, for example, valeric acid azide. In another process for making the new compounds there are used, instead of isocyanates, urethanes; and any desired carbamic acid ester, such as methyl, ethyl, propyl, butyl or aryl esters, can be used for this purpose. For example, a benzene sulphonyl-urethane substituted by 1 or 2 halogen atoms or by a halogen atom and an alkyl or alkoxy group in the benzene nucleus, may be reacted, for example, with butylamine or another primary amine, or, conversely, an alkyl-urethane may be reacted with an appropriate benzene-sulphamide, advantageously in the form of a salt thereof. Carbamic acid halides can also be used with special advantage. Thus, for example, the new sulphonyl-ureas are formed by reacting a butyl-carbamic acid chloride with a benzene sulphamide substituted by 1 or 2 halogen atoms or by a halogen atom and an alkyl or alkoxy group in the benzene nucleus, or by reacting a correspondingly substituted benzene sulphonyl-carbamic acid chloride with a butylamine or another primary amine. In a further process a correspondingly substituted benzene sulphonyl-urea, which is unsubstituted or substituted by other radicals, such as acyl and

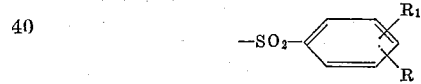

in the —$NH_2$ group, is converted into a benzene sulphonyl-alkyl-urea by reaction with amines of the formula $H_2N$—$R_2$, for example butylation, if desired, with butylamine. Alternatively, an alkyl-urea may be reacted with a benzene-sulphamide substituted by 1 or 2 halogen atoms or by a halogen atom and an alkyl or alkoxy group in the benzene nucleus. Instead of the alkyl-ureas there may be used the corresponding iso-urea ethers, advantageously in the form of their salts, and they are reacted with benzene sulphonic acid chlorides, and the product so obtained is then converted by acid hydrolysis into the desired sulphonyl-urea. Instead of the alkyl-ureas or the corresponding iso-urea ethers, other derivatives may be used.

In further processes for making the new compounds the corresponding thiourea is first prepared, and sulphur is eliminated therefrom in a conventional manner; or a corresponding N-benzene sulphonyl-N'-alkyl-guanidine is prepared in known manner (for example, reacting a benzenesulphonyl-cyanamide with a butylamine or with another primary amine), and the resulting guanidine is then hydrolysed. In all cases there may be used, instead of butylamine, another primary alkylamine, or an alkenylamine, cycloalkylamine or cycloalkyl-alkyl-amine. In these reactions the components are always to be chosen in such a manner that the radical $R_2$ contained in the reaction product contains 2 to 7 or 8 carbon atoms.

As alkyl residues, which may be present as substituents in the phenyl radical, and bound, if desired, through an oxygen atom, there may be mentioned, more especially, those of low molecular weight. Especially advantageous are those containing 1 carbon atom, but residues containing 2–6 carbon atoms may be present. When these residues are of higher molecular weight the activity of the products is generally considerably lower. The benzene-sulphonyl compounds may contain as substituents in the phenyl residue one or two halogen atoms, preferably chlorine or bromine atoms, or a halogen atom and an alkyl or alkoxy group.

The primary amines used as starting materials in the above processes advantageously contain alkyl-, alkenyl-, cycloalkyl- or cycloalkylalkyl radicals containing 2 to 6 carbon atoms. However, they may also contain 7 and 8 carbon atoms, but radicals of higher molecular weight generally reduce the activity of the products.

The reaction conditions under which the aforesaid processes are carried out may vary within wide limits and are adapted to each particular case. For example, the reactions may be carried out with the use of solvents at room temperature or at a higher temperature. Particularly suitable are the following processes:

(1) The reaction of a compound of the general formula

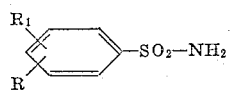

in which R and $R_1$ have the meanings given above, and advantageously in the form of a suitable alkali metal salt, with an isocyanate of the general formula $R_2$—NCO in the presence of a solvent, for example, nitrobenzene or acetone, at the ordinary or a higher temperature.

(2) The reaction of a benzene sulphonyl-carbamic acid ester of the general formula

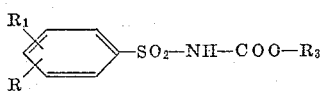

in which R and $R_1$ have the meanings given above, and $R_3$ represents any desired, preferably lower, hydrocarbon residue, with an equivalent quantity of an amine of the formula $R_2$—$NH_2$. In this case it is advantageous to use as solvent a glycol-monoalkyl ether and to conduct the reaction at a temperature within the range of 100° C. to 140° C. In this reaction the ratio of the reactants to solvent may be of importance; advantageously the proportion of solvent amounts to 55–66 percent of the total quantity of the reaction mixture.

To obtain the products in as pure a state as possible, it is advantageous to separate the product thoroughly from the benzene sulphamide used as starting materials or formed in the course of the reaction. Advantageously, this is carried out taking up the product in dilute ammonia (1 part by volume of ammonia to 20–30 parts by volume of water), since the sulphamides are generally sparingly soluble in this medium at room temperature.

Suitable starting materials are: halogen-benzenesulphonyl isocyanates, in which the halogen atom may be in any desired position of the benzene nucleus; correspondingly substituted benzenesulphamides; correspondingly substituted benzenesulphonyl-urethanes containing in the urethane component a lower alkyl radical, for example, a methyl, ethyl, propyl or butyl group, and more especially an ethyl group, or an aryl radical; correspondingly substituted benzenesulphonyl-ureas; and correspondingly substituted benzene sulphonic acid halides.

Furthermore, there may be used as starting materials: dihalogen-benzene-sulphonyl isocyanates, of which the halogen atoms may be in any desired positions of the benzene nucleus; correspondingly disubstituted benzene sulphamides; correspondingly disubstituted benzene-sulphonyl-urethanes containing in the urethane component a lower alkyl radical, for example, a methyl, propyl, butyl or especially an ethyl group, or an aryl residue; correspondingly disubstituted benzene-sulphonyl-ureas; correspondingly disubstituted benzene sulphonic acid halides; and correspondingly disubstituted benzene-sulphonyl carbamic acid halides.

There may also be used as starting materials methyl-chloro-benzene- and methoxy-chlorobenzene-sulphonyl derivatives for example, in the form of the chlorides, amides, isocyanates, carbamic acid halides, carbamic acid esters or ureas. Instead of the methyl group, an ethyl, propyl, butyl, pentyl or hexyl group may be present.

For the reaction with the compounds mentioned above there may be used the following primary amines: As alkylamines there may be mentioned, for example, ethylamine, n-propylamine, isopropylamine, n-butylamine, isobutylamine, secondary butylamine, tertiary butylamine, pentylamine-(1), pentylamine-(2), pentylamine-(3), 3-methyl-butylamine-(1), 2-methyl-butylamine-(1), 2:2-dimethyl-propylamine-(1), 3-methyl-butylamine-(2), hexylamines such as hexylamine-(1) and 2-methyl-pentylamine-(1), heptylamines such as heptylamine-(1) and heptylamine-(4), and octylamines such as octylamine-(1).

There may be mentioned as examples of alkenylamines, e.g. allylamine and crotylamine; as cycloalkylamines, e.g. cyclo-hexylamine and cyclopentylamine; and as cycloalkyl-alkylamines, e.g. cyclohexyl-methylamine and cyclohexyl-ethylamine.

Instead of using the aforesaid amines, the corresponding isocyanates, urethanes, carbamic acid halides, ureas or isourea ethers (obtainable from the aforesaid amines) may be reacted with suitably substituted benzene sulphamides or halides.

When the synthesis of the desired sulphonyl-urea starts from a corresponding thiourea, for example, from N-4-chloro- or N-4-bromo-benzenesulphonyl-N'-alkyl-, alkenyl-, -cycloalkyl- or -cycloalkylalkyl-thio-ureas the hydrocarbon radicals containing 2 to 7 or 8 carbon atoms, the sulphur may be eliminated with a heavy metal oxide or a salt thereof, for example, an oxide or salt of lead, copper or silver, in an aqueous or alcoholic solution.

Alternatively, the desired sulphonyl-urea can be prepared by hydrolysing an appropriately constituted guanidine with a dilute acid or alkaline solution.

As has been demonstrated by experiments on animals and in clinical tests, the products of the invention produce a substantial lowering of the blood sugar level. They may be used as such or in the form of their salts, or in the presence of substances that cause salt formation. For salt formation there may be used, for example, ammonia, an alkaline substance such as an alkali metal or alkaline earth metal hydroxide, an alkali metal carbonate or bicarbonate, or a physiologically tolerated organic base. These salts have the same blood sugar lowering properties. It is assumed that, by the alkaline reaction in the human alimentary tract, the compounds are converted into their salts and are absorbed as such. The compounds can be made up, inter alia, into preparations suitable for oral administration and lowering the blood sugar in the treatment of diabetes.

The preparations suitable for oral administration, for example tablets and dragées, can be prepared by homogeneously mixing the following ingredients, granulating them in the moist state, if necessary, and drying and pressing them.

0.5 gram of a compound of the general formula

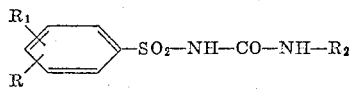

in which R stands for hydrogen, chlorine, bromine, alkyl and alkoxy groups containing up to 6 carbon atoms, $R_1$ represents chlorine and bromine and $R_2$ stands for an alkyl, alkenyl, cycloalkyl and cycloalkyl-alkyl radical containing 2–7 or 8 carbon atoms.

0.1395 gram of wheat or maize starch
0.0075 gram of talcum
0.003 gram of magnesium stearate.

A further object of the present invention is therefore: Pharmaceutical preparations which contain a compound of the general formula

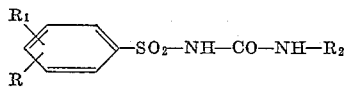

wherein R is a member selected from the group consisting of hydrogen, chlorine, bromine, alkyl- and alkoxy radicals having at most 6 carbon atoms, R is a halogen atom selected from the group consisting of chlorine and bromine and $R_2$ is a member selected from the group consisting of alkyl-, alkenyl-, cycloalkyl- and cycloalkyl-alkyl radicals containing 2 to 7 or 8 carbon atoms, and carriers, diluents and/or other products applied for the manufacture of pharmaceutical preparations.

In animal tests the action on the blood sugar level has been demonstrated, for example, on mice, rats, guinea pigs, rabbits, cats and dogs. When for instance, a compound of the invention is administered to normally fed rabbits in a single average dose of 400 mg./kg. in, for example, a solution rendered alkaline with bicarbonate, or in the form of an alkali metal salt, a lowering of the blood sugar level sets in rapidly and reaches a maximum (about 30 to 40 percent of the initial value) in the course of about 3 to 4 hours.

The blood sugar level can be measured by hourly analyses by the method of Hagedorn-Jensen. The lowering of the blood sugar is determined by comparison with the blood-sugar level of control animals fed in the same way but not so treated.

The activity of the products of the invention is shown in the following table:

TABLE I

| Substance (in the form of the sodium salt) | Maximum lowering of blood sugar in the rabbit; dose: 400 mg./kg. per os |
| --- | --- |
| | Percent |
| N-(4-chloro-benzenesulphonyl)-N'-n-butyl-urea | 30 |
| N-(3-chloro-benzenesulphonyl)-N'-n-butyl-urea | 50 |
| N-(4-chloro-benzenesulphonyl)-N'-allyl-urea | 25 |
| N-(4-chloro-benzenesulphonyl)-N'-cyclohexyl-urea | 30 |
| N-(4-chloro-benzenesulphonyl)-N'-n-hexyl-urea | 40 |
| N-(4-bromo-benzenesulphonyl)-N'-n-butyl-urea | 30 |
| N-(4-methyl-3-chloro-benzenesulphonyl)-N'-n-butyl-urea | 30 |
| N-(2-methyl-6-chloro-benzenesulphonyl)-N'-n-butyl-urea | 30 |
| N-(4-methyl-3-chloro-benzenesulphonyl)-N'-ethyl-urea | 35 |
| N-(3-chloro-4-methyl-benzenesulphonyl)-N'-isobutyl-urea | 30 |

The testing of the compounds on dogs has the advantage that the resorption conditions in the alimentary canal are similar to those of human beings, and that the blood sugar level exhibits smaller individual variations than in rabbits. In the canine tests the administration of small doses even of the free sulphonyl-ureas yields readily reproducible values. When the compound to be tested is administered to a dog, prior to feeding it, in a single dose of 100 mg./kg., and the blood sugar level is determined at certain intervals, the reductions in the blood sugar level shown in the following table are observed:

TABLE II

| Substance | Lowering of blood sugar level of the dog | |
| --- | --- | --- |
| | Percent | After hours— |
| N-(4-chloro-benzenesulphonyl)-N'-butyl-urea | 27 | 1 |
| | 40 | 3 |
| | 40 | 24 |
| | 32 | 48 |
| | 15 | 72 |
| | 0 | 96 |
| N-(4-bromo-benzenesulphonyl)-N'-n-butyl-urea | 63 | 1 |
| | 50 | 6 |
| | 50 | 24 |
| | 50 | 48 |
| | 30 | 72 |
| | 0 | 96 |

The above values were determined by comparison with the blood sugar levels measured on similarly fed, but untreated control animals.

As compared with compounds of similar constitution of the sulphanilyl series the compounds of the present invention are distinguished, on one hand, in that they are more resistant to external oxidising influences, such as atmospheric oxygen, which is of importance to their shelflife and handling, and, on the other, in that they have no bacteriostatic action.

Furthermore, the new compounds do not produce the secondary effects of sulphonamides on the blood (Heinz bodies) or on the thyroid gland, nor the digestive disturbances caused by action on the bacterial flora of the alimentary tract. The following examples serve to illustrate the invention; but they are not intended to limit it thereto:

*Example 1.—N-(4-chloro-benzenesulphonyl)-N'-n-butyl-urea*

95.5 grams of 4-chlorobenzene-sulphamide are suspended in 500 cc. of acetone and dissolved by addition of a solution of 20 grams of sodium hydroxide in 400 cc. of water. The solution is cooled to +10° C., and, while stirring vigorously, 49.5 grams of n-butyl isocyanate are slowly added dropwise. The reaction mixture is stirred until the odour of isocyanate has disappeared. It is then filtered with suction, about two thirds of the solvent are distilled off, the residue is diluted with water and carefully acidified with acetic acid, while stirring. The precipitate is at first somewhat pasty but becomes crystalline on standing in the cold. The N-(4-chlorobenzenesulphonyl)-N'-n-butyl-urea, obtained in a good yield, is purified by being dissolved in dilute ammonia solution. The solution is clarified with charcoal and acidified with dilute acetic acid. The precipitated N-(4-chloro-benzenesulphonyl)-N'-n-butyl-urea is filtered off with suction and thoroughly washed with water on the filter. After recrystallisation from dilute ethanol the product melts at 115–116° C.

In an analogous manner there is obtained from 3-chloro - benzene - sulphonamide, N-(3-chloro-benzenesulphonyl)-N'-n-butyl urea melting at 111–112° C.

2.9 grams of sulphonyl-urea are dissolved in 10 cc. of 1 N-sodium hydroxide solution. The solution is filtered and evaporated to dryness under reduced pressure. After drying over phosphorus pentoxide, the residue is an amorphus white powder which, when dissolved in water, yields a clear solution. There can be prepared aqueous solutions of different concentrations showing a pH-value of 8–9.

The sodium salt of N-(3-chloro-benzene-sulphonyl)-N'-n-butyl urea has no precise melting point but deliquesces slowly on heating above 60° C.

Example 2.—N-(4-chloro-benzenesulphonyl)-N'-cyclohexyl-urea 50 grams of finely ground potassium carbonate are added to a solution of 25 grams of 4-chlorobenzene-sulphamide in 200 cc. of dry acetone, and the suspension is refluxed for 3 hours. 16.5 grams of cyclohexyl isocyanate are then slowly added dropwise, while stirring, at 50° C. The mixture is further stirred at the same temperature until the odour of isocyanate is no longer detected. After being cooled, the mixture is filtered with suction, the residue is dissolved in water, any undissolved matter is filtered off, and the solution is decolorised with carbon. The sulphonyl-urea is then precipitated by cautiously adding an acid, then dissolved in dilute ammonia solution, the solution is clarified with carbon and acidified with acetic acid. A good yield of N-(4-chloro-benzenesulphonyl)-N'-cyclohexylurea precipitates. It is filtered off with suction, thoroughly washed on the filter with water, and recrystallised from acetonitrile. It melts at 158–159° C.

Example 3.—N-(4-bromo-benzenesulphonyl)-N'-n-butyl-urea

A solution of 8 grams of soduim hydroxide in 75 cc. of water is added to a solution of 47 grams of 4-bromo-benzene-sulphamide in 150 cc. of acetone. While stirring vigorously, 20 grams of n-butyl isocyanate are slowly added dropwise at 20° C. to the reaction mixture. When the addition is complete, the mixture is stirred until the odour of isocyanate has disappeared. The reaction mixture is then evaporated, and the residue is dissolved in water. The solution is clarified with carbon and acidified with hydrochloric acid. To purify the precipitated sulphonyl-urea, it is dissolved in dilute ammonia solution, and the solution is clarified with carbon and acidified with acetic acid. N-(4-bromo-benzenesulphonyl)-N'-n-butyl-urea is obtained in good yield. It is filtered off with suction, washed with water and recrystallised from dilute ethanol. It melts at 126–127° C.

Example 4.—N-(4-chloro-benzenesulphonyl)-N'-allyl-urea 34 grams of N-(4-chloro-benzenesulphonyl)-carbamic acid methyl ester melting at 92–93° C. (prepared by reacting 4-chloro-benzene-sulphamide with chloroformic acid methyl ester in the presence of anhydrous potassium carbonate) are dissolved in 50 grams of glycol monomethyl ether, 11.5 grams of allylamine are added to the solution and the reaction mixture is heated for 20 hours to 100° C. The residue obtained after distilling off the glycol monomethyl ether is treated with about 300 cc. of dilute ammonia (1:25), any undissolved matter is filtered off, the solution is decolorized with animal charcoal and the sulphonyl-urea is precipitated by slowly acidifying with 2 N-hydrochloric acid. After filtering with suction, washing with water and recrystallizing from ethanol of 70 percent strength, a good yield of N-(4-chloro-benzenesulphonyl)-N'-allyl-urea is obtained which melts at 183–184.5° C. Instead of glycol monomethyl ether there may also be used as solvents hydrocarbons such as xylene, toluene, chlorobenzene.

Example 5.—N-(4-chloro-benzenesulphonyl)-N'-cyclohexylmethyl-urea 66 grams of 4-(chloro-benzenesulphonyl)-carbamic acid ethyl ester (melting point 92–93° C.; prepared by reacting 4-chlorobenzene-sulphamide with chloroformic acid ethyl ester in the presence of dry pulverized potassium carbonate) and 29 grams of cyclohexylmethylamine are heated for 16 hours at 110° C. in 120 cc. of glycol monomethyl ether. The reaction mixture is concentrated under reduced pressure, water is added to the residue while still warm and it is then dissolved by cautiously adding a sodium hydroxide solution. The solution is clarified with animal charcoal and acidified with hydrochloric acid. The precipitate, which separates at first in the form of a smeary mass, soon solidifies when digested in the warmth. It is filtered with suction and washed well with water. For purification it is dissolved in dilute ammonia, any undissolved matter is filtered off, the solution is clarified with animal charcoal and acidified again with hydrochloric acid. The N-(4-chloro-benzenesulphonyl)-N'-cyclohexylmethyl-urea which separates in a good yield is filtered off with suction, washed well with water and, after drying, recrystallized from acetic acid methyl ester. The product melts at 171° C.

Example 6.—N-(4-chloro-benzenesulphonyl)-N'-n-butyl-urea

In a round flask 7.5 grams of n-butylamine are poured over 25 grams of N-(4-chloro-benzenesulphonyl)-carbamic acid methyl ester. The reaction mixture is heated in an oil bath to about 120–130° C., while the methanol formed during the reaction is distilled off under reduced pressure. After about 1–1½ hours the product is allowed to cool and the N-(4-chloro-benzenesulphonyl)-N'-butyl-urea obtained is dissolved in dilute alcohol and then reprecipitated. The product melts at 115–116° C.

Example 7.—N-(4-methyl-3-chloro-benzenesulphonyl)-N'-(n-butyl)-urea 51 grams of 4-methyl-3-chloro-benzene-sulphamide are suspended in 80 cc. of acetone. The suspension is mixed with 150 cc. of caustic soda solution containing 10 grams of sodium hydroxide, and, while stirring, 25 grams of n-butyl isocyanate are added dropwise, the temperature being maintained at about 10° C. The reaction solution is clarified with carbon, filtered, and acidified with dilute acetic acid. A good yield of crystalline N-(4-methyl-3-chloro-benzenesulphonyl)-N'-(n-butyl)-urea is obtained. It is recrystallised from dilute ethanol or from isopropanol. It melts at 145–146° C.

In analogous manner there is obtained from 103 grams of 2-methyl-6-chlorobenzene-sulphamide in 165 cc. of acetone and 330 cc. of caustic soda solution (containing 20 grams of sodium hydroxide) by reaction with 50 grams of n-butyl isocyanate, N-(2-methyl-6-chloro-benzenesulphonyl)-N'-(n-butyl)-urea melting at 154–155° C.

3.1 grams of the N-(4-methyl-3-chloro-benzenesulphonyl)-N'-(n-butyl)-urea are dissolved, while heating, in an equivalent quantity of 1 N-sodium hydroxide solution (about 10 cc.). On cooling, the sodium salt of N-(4-methyl-3-chloro-benzenesulphonyl)-N'-n-butyl-urea separates. After drying for 1 day it melts above 165° C. The sodium salt is easily soluble in warm water but rather difficultly soluble in cold water. The solutions show a pH-value of 8–9.

Example 8.—N-(4-methyl-3-chloro-benzenesulphonyl)-N'-isobutyl-urea (a) A suspension of 64 grams of 4-methyl-3-chloro-benzenesulphamide, 120 grams of potassium carbonate and 600 cc. of acetone is heated, while stirring, for 1 hour at 55° C. 37.6 grams of ethyl chlorocarbonate are then slowly added dropwise, and the whole is stirred for 4 hours at 55° C. After cooling the mixture, the precipitate is filtered off with suction and dissolved in 500 cc. of water. The filtrate is clarified with animal charcoal and acidified with hydrochloric acid to precipitate 4-methyl-3-chlorobenzenesulphonyl-carbamic acid ethyl ester in the form of a smeary mass which soon crystallises throughout. The resulting 4-methyl-3-chloro-benzenesulphonyl-carbamic acid ethyl ester is filtered off with suction and washed with water. The product melts at 85–87° C.

(b) 55.5 grams of the resulting dried 4-methyl-3-chloro-benzenesulphonyl-carbamic acid ethyl ester are refluxed at the boil for 4 hours with 16 grams of isobutyl-amine in 107 grams of glycol monomethyl ether. The mixture is then evaporated under reduced pressure. The warm residue is dissolved in dilute ammonia solution. The solution so obtained is clarified with animal charcoal and a small quantity of 4-methyl-3-chloro-benzene-sulphamide is removed. Acidification of the filtrate with dilute hydrochloric acid produces a crystalline precipitate of N-(4-methyl-3-chloro-benzenesulphonyl)-N'-isobutyl-urea, which is filtered off with suction and recrystallised from aqueous ethanol of 75 percent strength. The product melts at 157–159° C.

*Example 9.—N-(4-methoxy-3-chloro-benzenesulphonyl)-N'-allyl-urea*

20 grams of N-(4-methoxy-3-chloro-benzenesulphonyl)-carbamic acid methyl ester melting at 142–144° C. (prepared by reacting 4-methoxy-3-chloro-benzene-sulphamide with chloroformic acid methyl ester in the presence of anhydrous potassium carbonate), 80 grams of 1.2-dichlor-benzene and 4.6 grams of allylamine are heated for 7½ hours at 120° C. The reaction mixture is cooled and extracted twice with 0.5 N-sodium hydroxide solution. The combined alkaline solutions are treated for clarification with animal charcoal and are then slowly acidified with 2 N-hydrochloric acid. The precipitate is filtered off with suction, taken up in about 150 cc. of dilute ammonia (1:25), the undissolved matter is filtered off and the sulphonyl-urea is precipitated by acidifying with 2 N-hydrochloric acid. After recrystallisation from about 110 cc. of ethanol of 60 percent strength, the N-(4-methoxy-3-chloro-benzenesulphonyl)-N' - allyl - urea is obtained in a good yield. It melts at 143–144° C.

*Example 10.—N-(4-chloro-benzenesulphonyl)-N'-hexyl-(1)-urea*

25 grams of para-chloro-benzene-sulphamide are dissolved in 200 cc. of acetone, 50 grams of powdered potassium carbonate are added and, while stirring at 40° C., 18 grams of n-hexylisocyanate are slowly added dropwise. The reaction mixture is refluxed for 3 hours and the acetone is then distilled off. The residue is dissolved in dilute ammonia, the solution is clarified with animal charcoal and reacidified with hydrochloric acid. The N-(4-chloro-benzenesulphonyl)-N' - hexyl - (1) - urea obtained in a good yield is filtered off with suction, washed well with water and, after drying, recrystallized from acetonitrile. It melts at 115° C.

*Example 11.—N-(3-chloro-4-methyl-benzenesulphonyl)-N'-ethyl-urea*

28 grams of 3-chloro-4-methyl-benzenesulphonyl-ethylurethane (prepared by reacting 3-chloro-4-methyl-benzene-sulphamide and chloroformic acid ethyl ester in acetone in the presence of potassium carbonate) are dissolved in 40 cc. of a solution of 20 percent strength of ethylamine in benzene. The benzene and the ethylamine in excess are distilled off and the residue is heated for 2 hours at 130° C. in the oil bath. After cooling, the residue is dissolved in dilute ammonia, the solution is clarified with animal charcoal and cautiously acidified in the heat with hydrochloric acid. After cooling, the N-(3-chloro-4-methyl-benzenesulphonyl)-N'-ethyl-urea which has precipitated in a good yield is filtered off with suction and washed with water. After drying and recrystallizing from acetonitrile, the substance melts at 137–138° C.

We claim:
1. A tablet for oral administration and the lowering of blood sugar in the treatment of diabetes comprising about 0.5 gram of a compound selected from the group consisting of (1) a sulfonyl urea of the formula:

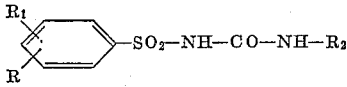

wherein R is selected from the group consisting of hydrogen, chlorine, bromine, methyl and methoxy, $R_1$ is selected from the group consisting of chlorine and bromine, and $R_2$ is of 2 to 7 carbon atoms selected from the group consisting of alkyl-, alkenyl-, cycloalkyl- and cycloalkylalkyl and (2) non-toxic basic addition salts thereof, and a pharmaceutical diluent.

2. A tablet for oral administration and the lowering of blood sugar in the treatment of diabetes comprising about 0.5 gram of a sulphonyl urea of the formula:

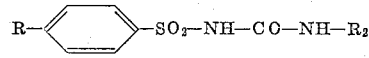

wherein R is chlorine and $R_2$ is alkyl of 2 to 7 carbon atoms, and a pharmaceutical diluent.

3. A tablet for oral administration and the lowering of blood sugar in the treatment of diabetes comprising about 0.5 gram of N-(4-chlorobenzenesulphonyl)-N'-n-butylurea, and a pharmaceutical diluent.

4. A process for the lowering of blood sugar in the treatment of diabetes which comprises orally administering an effective amount of a composition having as the essential active ingredient a compound selected from the group consisting of (1) a sulphonyl urea of the formula:

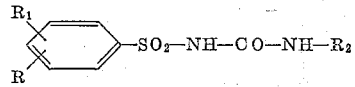

wherein R is selected from the group consisting of hydrogen, chlorine, bromine, methyl and methoxy, $R_1$ is selected from the group consisting of chlorine and bromine, and $R_2$ is of 2 to 7 carbon atoms selected from the group consisting of alkyl-, alkenyl-, cycloalkyl- and cycloalkylalkyl, and (2) non-toxic basic addition salts thereof.

5. A process for the lowering of blood sugar in the treatment of diabetes which comprises orally administering an effective amount of a composition having as the essential active ingredient a sulphonyl urea of the fromula:

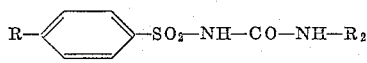

wherein R is chlorine and $R_2$ is alkyl of 2 to 7 carbon atoms.

6. A process for the lowering of blood sugar in the treatment of diabetes which comprises orally administering an effective amount of a composition having as the essential active ingredient N-(4-chlorobenzenesulphonyl)-N'-n-butylurea.

References Cited by the Examiner

UNITED STATES PATENTS 2,371,178  3/45  Martin _____ 260—553

FOREIGN PATENTS 993,465  10/51  France.
120,428  12/47  Switzerland.

OTHER REFERENCES

Deutsche Medizinische Wochenschrift, volume 80, No. 40, pages 1449–1460, October 7, 1955.

Northey: The Sulfonamides and Allied Compounds, A.C.S. Monograph Series, No. 106, Reinhold Publishing Co., 1948, pages 251–254, 285–294, 422–430, and 633–635.

Ehrhart: Die Naturivissenschften, Jahrg 43, Heft 4, 1956, second Febr. issue, Report of the Congress of the German Society for Digestive and Metabolic Diseases, XVIII, Bad Homburg, from October 3–5, 1955.

Loubatieres: Annals. of N.Y. Acad. of Science, vol. 74, art. 3, March 30, 1959, p. 413.

McLamore: Annals. of N.Y. Acad. of Science, vol. 74, art. 3, March 30, 1959, pp. 443–444.

FRANK CACCIAPAGLIA, JR., *Primary Examiner.*
M. O. WOLK, IRVING MARCUS, LEWIS GOTTS, *Examiners.*

UNITED STATES PATENT OFFICE

CERTIFICATE OF CORRECTION

Patent No. 3,198,706                                              August 3, 1965

Heinrich Ruschig et al.

It is hereby certified that error appears in the above numbered patent requiring correction and that the said Letters Patent should read as corrected below.

Column 3, line 54, for "55-66" read -- 55-65 --; column 10, line 55, for "Switzerland" read -- Sweden --.

Signed and sealed this 15th day of March 1966.

(SEAL)
Attest:

ERNEST W. SWIDER                                      EDWARD J. BRENNER
Attesting Officer                                         Commissioner of Patents